July 13, 1937. S. CLAUSEN Re. 20,441

BUNCH SHAPER AND BUNCH MOISTENER FOR CIGAR MACHINES

Original Filed Jan. 20, 1933 4 Sheets-Sheet 1

Inventor
Sigurd Clausen
George S. Hastings
Attorney

BUNCH SHAPER AND BUNCH MOISTENER FOR CIGAR MACHINES

Original Filed Jan. 20, 1933 4 Sheets-Sheet 2

Inventor

Sigurd Clausen

George S. Hastings

Attorney

BUNCH SHAPER AND BUNCH MOISTENER FOR CIGAR MACHINES

Original Filed Jan. 20, 1933 4 Sheets-Sheet 3

Inventor
Sigurd Clausen
George E. Hastings
Attorney

BUNCH SHAPER AND BUNCH MOISTENER FOR CIGAR MACHINES

Original Filed Jan. 20, 1933 4 Sheets-Sheet 4

INVENTOR
Sigurd Clausen
BY
George S. Hastings
ATTORNEY

Reissued July 13, 1937 Re. 20,441

UNITED STATES PATENT OFFICE 20,441

BUNCH SHAPER AND BUNCH MOISTENER FOR CIGAR MACHINES

Sigurd Clausen, Brooklyn, N. Y., assignor to International Cigar Machinery Company, a corporation of New Jersey Original No. 1,945,022, dated January 30, 1934, Serial No. 652,711, January 20, 1933. Application for reissue May 10, 1935, Serial No. 20,865

15 Claims. (Cl. 131—9)

This invention relates to an improved cigar bunch shaping mechanism, which may be used in the manufacture of fresh work cigar bunches having shaped ends, its main object being to produce a construction operating at a higher speed than any prior devices of this type. With this and other objects not specifically mentioned in view, the invention consists in certain constructions and combinations which will be hereinafter fully described and then specifically pointed out in the claims hereunto appended.

The bunch shaping mechanism, which is specially adapted for high speed cigar machines, is provided with two bunch shaping devices mounted in diametrically opposite positions on an intermittently rotating support or turret controlled by a Geneva wheel drive, which advances the support by 180 degree steps to bring each device into bunch receiving position successively. At this station the shaping jaws of each device are closed on the ends of the bunch and they are then held in closed position during one revolution of the support. When each device returns to the bunch receiving station its jaws are opened and the shaped bunch is removed and replaced by an unshaped bunch.

In the accompanying drawings which form a part of this specification and in which like characters of reference indicate the same or like parts:

In carrying the invention into effect there is provided in combination two bunch end shaping devices each having shaping jaws and an actuating member, a support for said devices, mechanism for rotating said support in 180 degree steps, and means for successively operating said members to close said jaws. In the best constructions contemplated said means includes a cam operated reciprocable plunger arranged at one station of the support to engage the operating member of each device successively to close the jaws. There is also provided in the best constructions contemplated, means engaging the actuating members of said devices for maintaining or holding the jaws in closed relation during the revolution of the support, and there is also provided a bunch transfer for delivering bunches between the jaws of each device successively. These various means and parts may be widely varied in construction for the particular structure selected to illustrate the invention is but one of many possible concrete embodiments of the same. The invention, therefore, is not to be restricted to the specific construction shown and described.

Figure 2:
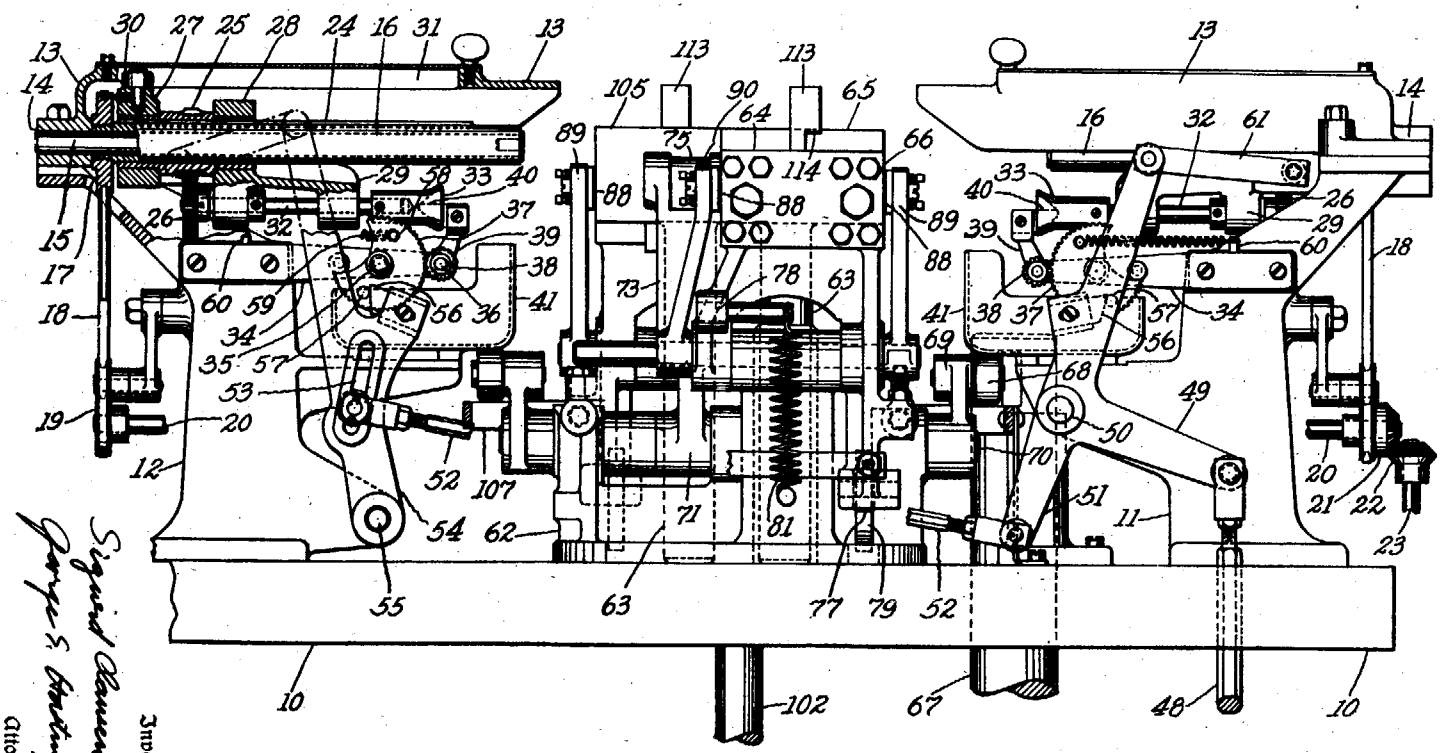
Fig. 2 is a front elevation of the same partly in section.

Referring to the drawings, the bed 10 of the cigar machine supports standards 11 and 12, which carry brackets 13. The capped ends 14 of the brackets 13 are secured to the standards 11 and 12, and are each provided with bearings which support a horizontal stationary shaft 15. Referring now to the left hand portion of Fig. 2 in which the left hand bracket 13 is shown in section, a sleeve 16 turnably mounted on the shaft 15, carries a pulley 17 which is driven by a belt 18 running over a drive pulley 19 mounted on the shaft 20. The shaft 20 at its right hand end carries a bevel gear 21 meshing with a bevel gear 22 mounted on a vertical drive shaft 23 driven from the main drive of the cigar machine.

The sleeve 16 carries a key 24 which is slidably mounted in a keyway in a spur gear 25 mounted on the sleeve and meshing with a gear 26. The ends of the gear 25 are turnably mounted in bearings 27 and 28 of the axially sliding bracket 29. A roller 30 mounted on a stud secured in the bearings 27, travels in a slot 31 of bracket 13 and prevents the bracket 29 from turning. The bracket 29 supports the shaft 32 on which are fixed the gear 26 and the locator cup 33. As the construction of the right hand bracket 13 and shaft 15 and the parts supported thereon is identical with that of the left hand bracket a detailed description thereof is deemed unnecessary.

On each of the standards 11 and 12 an arm 34 carries studs 35 and 36; on the former stud is a gear segment 37 meshing with a gear 38 on stud 36. An arm 39 fastened to the stud 36, carries a felt piece 40 which fits the inner contour of the locator cup 33. The motion imparted by the gears 37 and 38 actuates the arm 39 to and fro between a water pot 41 and the locator 33.

Figures 1, 5:
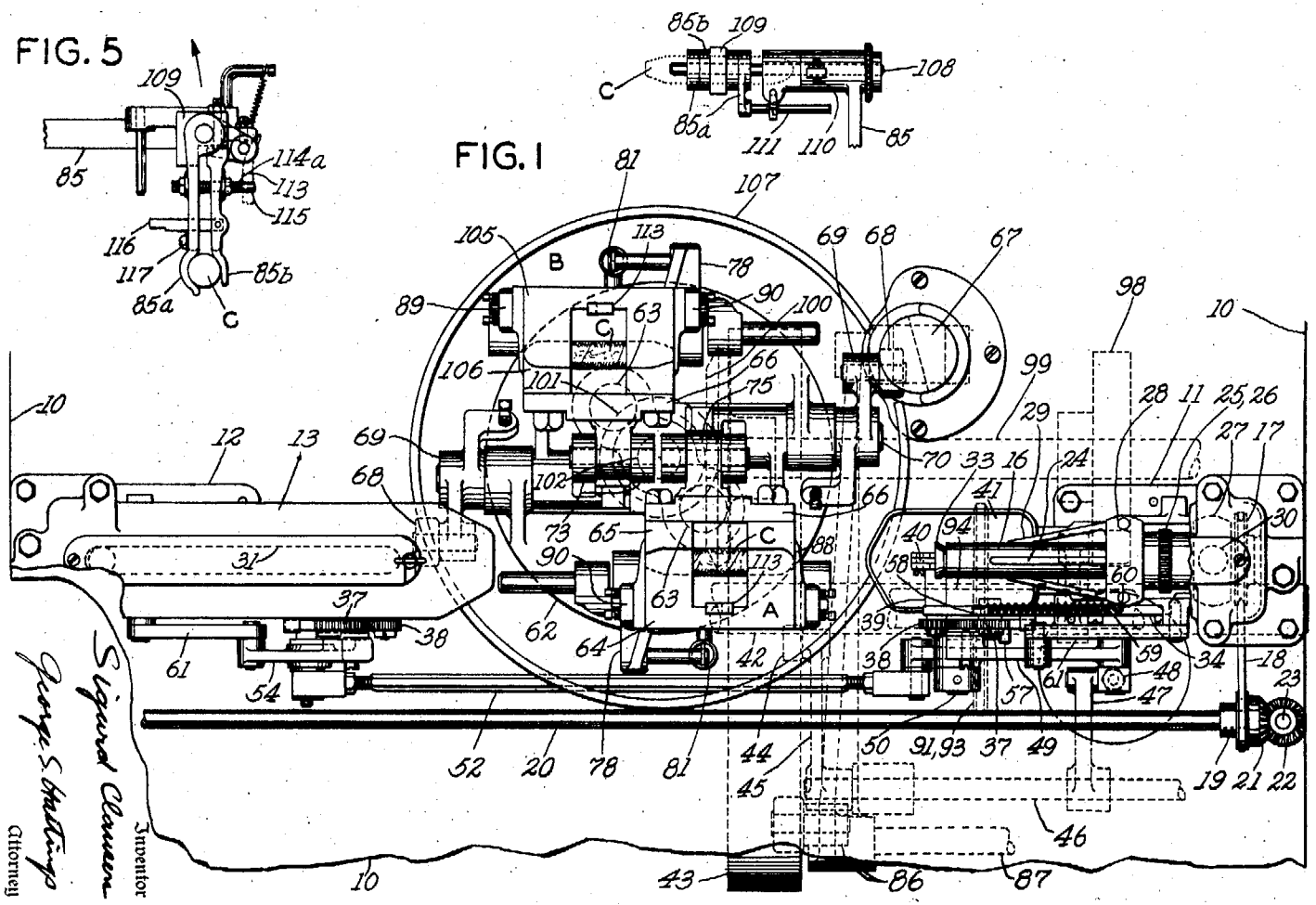
Fig. 1 is a plan view of a portion of a high speed cigar machine, showing the improved cigar bunch shaping mechanism and a bunch locator for positioning the bunches axially before they are delivered to the bunch shaping device.
Fig. 5 is a detail view of the bunch transfer which delivers unshaped bunches to the shaping devices.

Referring now to Fig. 1, a cam shaft 42 which is suitably driven from the main drive of the cigar machine, has fastened to it a double-track cam 43. A cam roller 44 engages in one of the cam tracks of cam 43 thereby actuating a lever 45 fastened to a pivotally mounted shaft 46, which also carries an arm 47. The latter is connected to one end of a rod 48, the other end of which is connected to one arm of a lever 49 (see Fig. 2), which is pivotally mounted on a stud 50 carried by the standard 11. A downwardly projecting arm 51 of the lever 49 carries a rod 52, the other end of which is provided with a roller mounted in a slot 53 of arm 54, the latter being pivotally mounted on a stud 55 carried by the standard 12. The arm 54 and the lever 49 carry adjustable pushers 56 engaging with driving pins 57 located in the gear segments 37. The latter also carry posts 58 to which are attached the tension springs 59 anchored to posts 60. The upper ends of the lever 49 and arm 54 are joined to the sliding brackets 29 by connecting links 61, thereby actuating the locator cups as hereinafter described.

Figure 3:
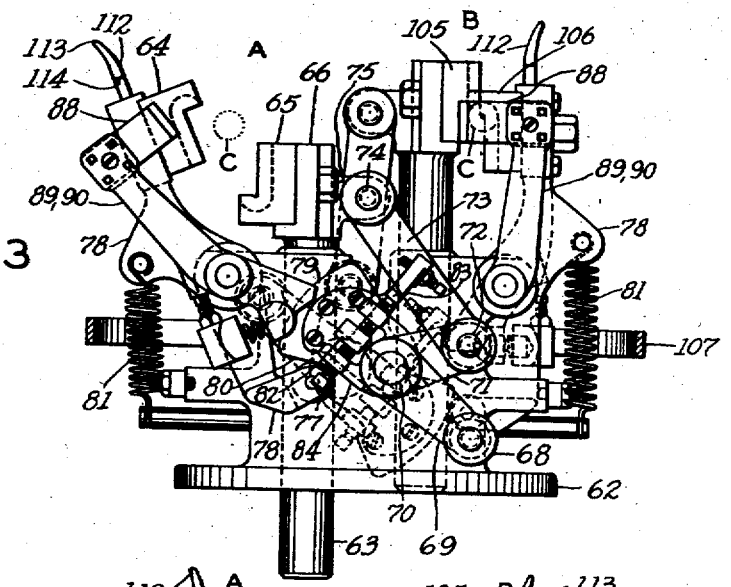
Figs. 3 and 4 are side elevations of the cigar bunch shaping mechanism showing its parts in different operating positions.
Figure 4:
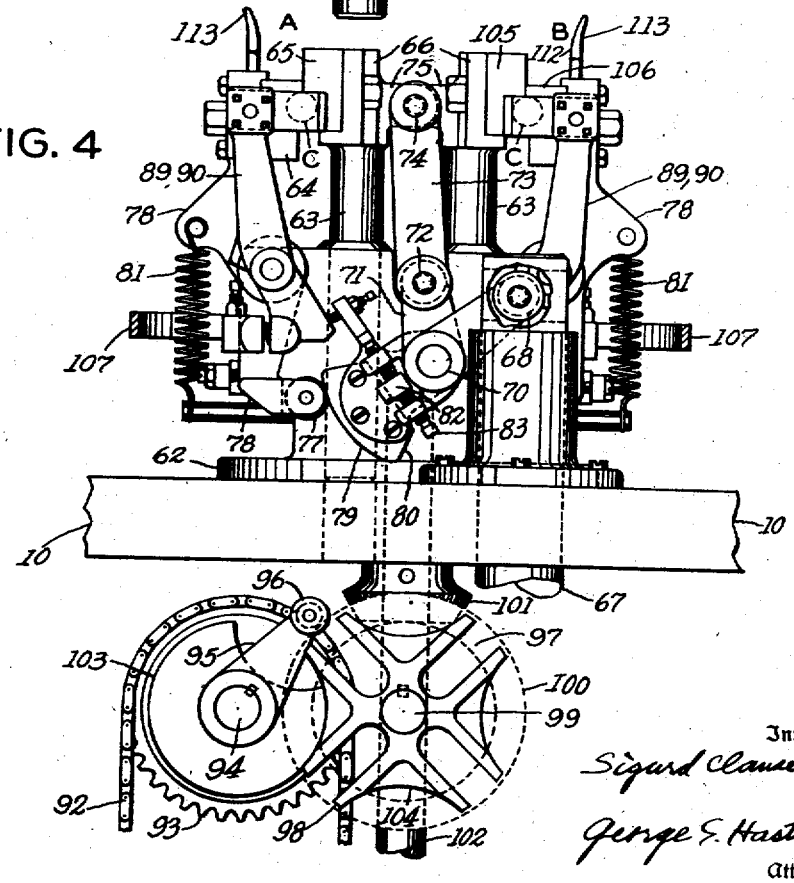
Figure 7:
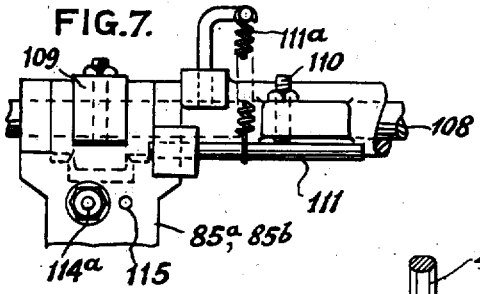
Fig. 7 is another view of the detail shown in Fig. 5.
Figure 6:
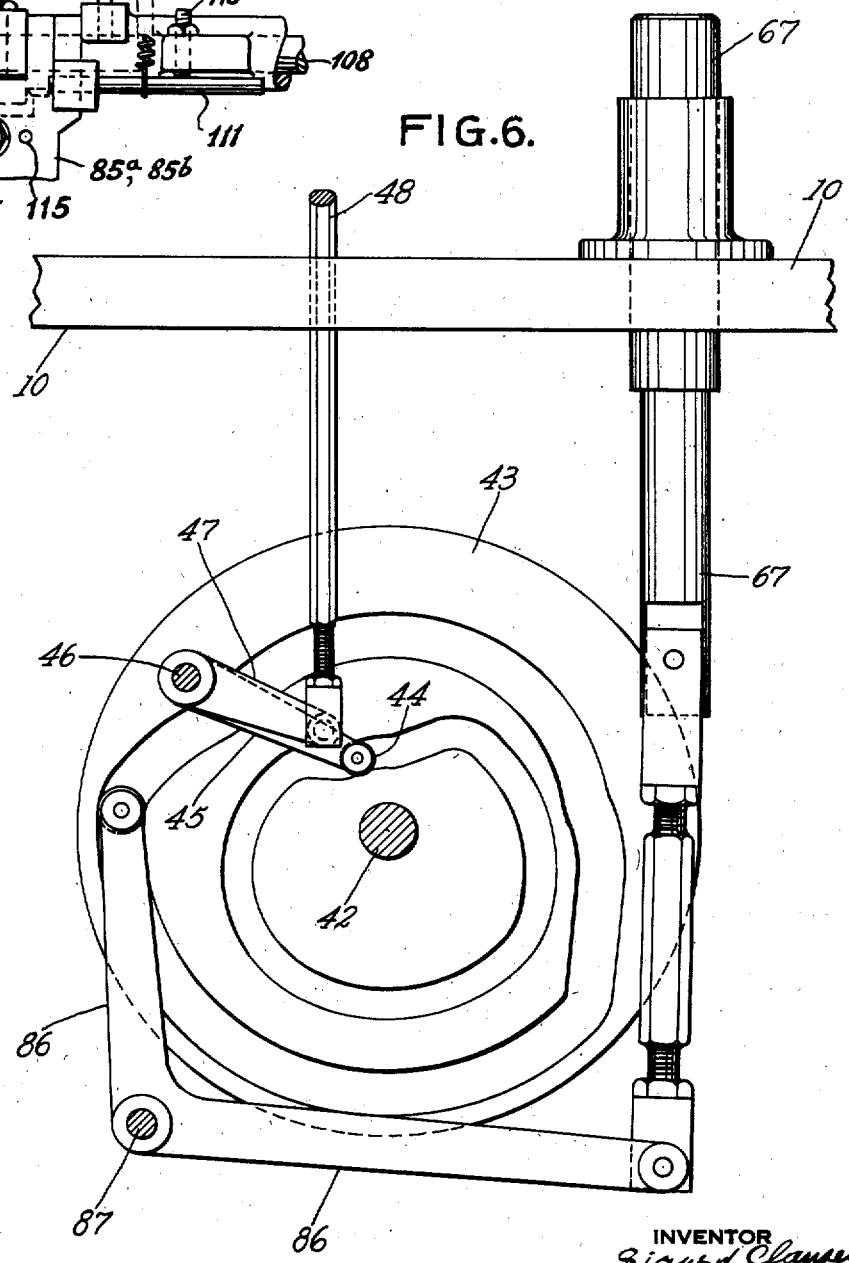
Fig. 6 is a detail view of the cam 43 and the linkages actuated therefrom.

The bed 10 also supports a turret or support 62 which is intermittently rotated in 180 degree steps by a Geneva drive hereinafter described, and provided with diametrically opposite spaced bearings in which are mounted the vertically sliding posts 63. Referring to Fig. 3, the bunch end shaping jaws 64 and 65 of the bunch end shaping device at station "A" are shown in their open or bunch receiving position, the jaws of the other shaping device at station "B" being held in closed relation by means hereinafter described. The head 66 on the post 63 of the shaping device at station "A" carries the lower shaping jaw 65 which, as shown in Fig. 3, has just been lowered by means of a cam operated plunger 67 (see Figs. 1, 2 and 4), provided with a transverse slot adapted to receive the roller 68 carried by an actuating member or arm 69 fastened on a shaft 70 pivoted in the turret 62, thereby rocking shaft 70 and actuating an arm 71 having one end fixed thereto. The other end of arm 71 is pivotally connected at 72 to a link 73 which is connected by a stud 74 to a lug 75 of the head 66. When the roller 68 rides into the transverse slot in the plunger 67, the arm 69 is first actuated by the downward movement of the plunger to lower the shaping jaw 65. At the proper time the arm 69 is subsequently actuated by the upward movement of the plunger to turn the shaft 70 thereby raising the shaping jaw 65. Meanwhile the roller 77 carried on the lower end of a swinging bracket 78 pivoted on turret 62 and carrying the upper shaping jaw 64, leaves the radial cam face 80 of cam piece 79 mounted on the shaft 70 and then engages the arcuate cam surface thereof, causing the shaping jaw 64 to move inwardly into closed relation with jaw 65. Simultaneously with the downward movement of the shaping jaw 65, due to the downward movement of the plunger 67, the bracket 78 is swung outwardly as a result of the inward radial motion of roller 77 along cam face 80, and the tension of spring 81 attached to bracket 78 and anchored to the turret.

In order to obtain exact timing of the movement of the upper shaping jaw with respect to the lower shaping jaw, the cam 79 is made adjustable with reference to the arm 69. This is done by providing cam 79, which is loosely mounted on shaft 70, with a lug 82, which is between a pair of adjuster screws 83 in the arms of a yoke 84, which is fastened on shaft 70 and thus moves with the arm 69 also fastened on shaft 70.

When the other bunch end shaping device arrives at station "A" its shaping jaws 105 and 106 are similarly actuated from the plunger 67 by similar parts having the same characters of reference. For this reason a detailed description of the construction and operation of the same appears to be unnecessary.

The operation of the combined mechanism is as follows:

The switching transfer arm 85 (Figs. 1 and 5), is intermittently oscillated by any suitable means of well known type, such as shown in my prior Patent No. 1,740,575, granted Dec. 24, 1929. A sprocket on shaft 108 which is loosely mounted in the free end of the transfer arm is connected with a fixed sprocket (not shown), by a chain running over both sprockets, thereby maintaining a block 109 carried by the shaft 108 in its vertical position during the swing of arm 85. The shaft 108 also carries gripper fingers **85*a* and 85*b*, which carry the cigar bunches C from the bunch softener mechanism, not shown, to the bunch shaping jaws, the fingers 85*a* and 85*b* being loosely mounted on the shaft 108 and the finger 85*b* being turned with block 109 by a stop screw on the latter engaging said finger. The motion of the arm 85** is timed in reference to the bunch shaping devices, and delivers the bunches C when the shaping jaws are in their open position at station A (Fig. 3).

At the completion of the stroke of arm 85 a stop screw 110 on the arm 85 engages and slightly depresses a rod 111 carried by a projecting arm of the inner finger **85*a*, thereby acting against the tension of a spring 111*a* connected to the rod and pressing the fingers 85*a* away from the bunch C and finger 85*b*. The bunch is now held loosely by the gripper fingers 85*a* and 85*b*, thus permitting the revolving reciprocatory bunch locators 33, which then engage the bunch, to axially slide the same, thereby positioning each bunch C correctly in reference to the bunch shaping devices. The bunch C is located while in the position shown in dotted lines at station A (Fig. 3). When the locator cups 33 engage the bunch C the water previously deposited on their interior is transferred to the ends of the bunch, thereby preventing the same from sticking to the bunch shapers. The cam 43 through the linkage connecting the locators 33 to each other and the cam then returns the locators to their inoperative position. Thereupon the same cam 43 actuates the lever 86, which has a cam roller engaging in one track of said cam and is fulcrumed on shaft 87, to raise the plunger 67** to which the other end of the lever is connected.

Referring again to Figs. 3 and 4, as the cam operated plunger rises, by means of its engagement with the roller 68 of one of the bunch shaping devices, it causes the arm 69 to turn the shaft 70. The turning of shaft 70 actuates the arm 71 and then its connecting link 73 raises the lower shaping jaw 65. The rotation of shaft 70 also turns the cam 79 and permits the roller 77 carried by the swinging arm 78 to leave the radial cam face 80 of cam piece 79 and ride upon its arcuate cam surface whereby the swinging arm 78 is swung inwardly.

The inward motion of the swinging arm 78 causes the face 112 of a cam piece 113 projecting from the swinging arm 78 to press against a stud **114*a* carried by the finger 85*b*, and swing the bunch carrying unit from its locating position into the path of the rising bunch shaping jaw 65. The continued upward motion of the jaw 65, and the inward motion of jaw 64**, finally arrests the bunch C. The bunch thus securely lodged between the shaping jaws has its ends cut off by the knives 88 of the trimmers 89 and 90. Pairs of trimmers 89, 90 are mounted on the ends of parallel rock shafts supported on diametrically opposite portions of the turret 62 adjacent each set of shaping jaws 64, 65 and 105, 106 and normally maintained in a retracted position by compression springs interposed between the tails of the trimmers 89 and sockets pivoted on the turret. When the cams 80 are successively swung downwardly during the actuation of their respective arms 69 to effect the closing of the corresponding set of bunch shaping jaws, the stop screw on the cam 80 engages the tail of the corresponding trimmer 89 and thereby turns the rocker shaft with the trimmers to trim the bunch ends immediately after the jaws are closed on the same. The gripper fingers 85a and 85b are then released from the bunch C, this being accomplished by the upward return motion of the swinging arm 85. During the upward motion of the arm the laterally extending ear 114 on cam piece 113 trips stud 115 carried by the inner finger 85a, thus opening the same and releasing the bunch which is then held between the bunch shaping jaws. The outward swinging of fingers 85a permits a latch 116 which is pivotally mounted on the finger 85b to drop into engagement with the lock plate 117, which connects the fingers 85a and holds the same in their open position while the transfer arm 85 makes its return stroke.

The shaping jaws now being in their closed position, the turret 62 is ready to rotate. The turret is intermittently rotated in 180 degree steps by means of a Geneva drive which will now be described. The cam shaft 42 carries a sprocket 91 which drives a chain 92 running over a sprocket 93 fixedly mounted on an intermediate shaft 94. Mounted on shaft 94 is an arm 95 carrying a roller 96 which engages with the tracks 97 of the Geneva wheel 98. The latter is mounted on a shaft 99 which also carries a bevel gear 100 meshing with bevel gear 101 attached to shaft 102, which is fastened to the turret 62. The rotation of shaft 94 permits the roller 96 to engage with the tracks 97 and thereby revolve the Geneva wheel one-quarter of a turn, at the completion of which the disc 103 of arm 95 comes into engagement with the arcuate portions 104 of the Geneva wheel and locks the same. This intermittent turning of shaft 99, by means of gears 100 and 101 intermittently rotates the turret 62 one-half revolution. In this manner the shaping jaws 105 and 106 at station "B" are rotated to the position previously occupied by the shaping jaws 64 and 65. Now, in the same manner as previously described in connection with the shaping jaws 64 and 65, the shaping jaws 105 and 106 are opened, and the bunch C is carried away by a transfer arm (not shown) of either the general type shown in Patent #1,786,608, granted December 30, 1930, on the application of J. F. Halstead, or Patent #1,721,551, granted July 23, 1929, on the application of L. Ferenci, to the wrapping device of the cigar machine.

After leaving station A the jaws 64 and 65 are held in closed position on the ends of the bunch during one revolution of the turret against accidental release by a stationary circular guard rail 107 adjacent the roller 68 on the actuating member 69, until they return to station A, where they are again opened by the engagement of the plunger 67 with the roller 68 to permit the shaped bunch to be removed. The jaws 105 and 106 are similarly held closed on the ends of the bunch during one revolution of the turret by the cam rail 107, and opened, when they return to station A, by the operation of the plunger 67.

What is claimed is:

1. The combination with two bunch end shaping devices each having shaping jaws and an actuating member, of a support for said devices, mechanism for rotating said support in 180 degree steps, and means for successively operating said members to close said jaws.

2. The combination with two bunch end shaping devices each having shaping jaws and an actuating member, of a support for said devices, mechanism for rotating said support in 180 degree steps, and means for successively operating said members to close said jaws, said means including a reciprocable plunger arranged at one station of said support to engage the actuating member of each shaping device successively to close said jaws.

3. The combination with two bunch end shaping devices each having shaping jaws and an actuating member, of a support for said devices, mechanism for rotating said support in 180 degree steps, and means for successively operating said members to close said jaws, and means adjacent said members to maintain said jaws in closed relation during one revolution of said support.

4. The combination with two bunch end shaping devices each having shaping jaws and an actuating member, of a support for said devices, mechanism for rotating said support in 180 degree steps, and means for successively operating said members to close said jaws, and a stationary circular rail adjacent said members to maintain said jaws in closed relation during one revolution of said support.

5. The combination with two bunch end shaping devices each having shaping jaws and an actuating member, of a support for said devices, mechanism for rotating said support in 180 degree steps, and means for successively operating said members to close said jaws, said mechanism including a Geneva drive connected to said support to rotate it by 180 degree steps.

6. The combination with two bunch end shaping devices, each having jaws and an actuating member, of a support for said devices, mechanism for rotating said support in 180 degree steps, a bunch transfer for delivering cigar bunches between the jaws of each shaping device successively, and means for successively operating said members to close the jaws of each device on a bunch delivered therebetween and remove it from said transfer.

7. The combination with a plurality of bunch shaping devices each having shaping jaws arranged to act on a cigar in horizontal position, of a support for said devices, an actuating member for operating the jaws, mechanism for intermittently rotating said support about a vertical axis, and a movable operating element external to the support arranged at one station of the support to enter into operating relationship with said actuating member as the latter arrives at said station to open said jaws.

8. The combination with a plurality of bunch shaping devices each having shaping jaws arranged to act on a cigar in horizontal position and an actuating member for operating the jaws, of a support for said devices, mechanism for intermittently rotating said support about a vertical axis, and a movable element external to the support arranged to engage the actuating member of each shaping device successively to close said jaws.

9. The combination with a plurality of bunch shaping devices, each having opposed shaping jaws and a single actuating member, connections between each of said members and the opposed jaws of one of said devices to move said jaws in paths substantially at right angles to each other to open and close the same, of a support for said devices, mechanism for intermittently rotating said support, and a movable structure external to said support arranged to operate said member to open and close said jaws.

10. The combination with a plurality of bunch shaping devices each having shaping jaws and an actuating member, of a support for said devices, mechanism for rotating said support, means for successively operating said members to close said jaws, and means co-operating with said members to maintain said jaws in closed relation during one revolution of said support, said means including a stationary guard extending along the path of travel of said member on said support.

11. The combination with a plurality of bunch shaping devices each having shaping jaws and jaw actuating connections operable to hold the jaws closed and releasable to open said jaws, a support for said devices, mechanism for rotating said support, means for successively operating said actuating connections at a predetermined position of said support, and a guard structure preventing release of said connections except at said position.

12. The combination with a plurality of bunch shaping devices each having shaping jaws and actuating connections for opening and closing said jaws, of a support for said jaws, mechanism for intermittently rotating said support, means for successively operating said connections to close said jaws, a movable transfer for delivering bunches to said jaws during dwells in the rotation of the support, locators, means moving said locators into engagement with the ends of a bunch in said transfer to locate the same prior to shaping operation of the jaws thereon.

13. The combination with a plurality of bunch shaping devices each having shaping jaws and actuating connections for opening and closing said jaws, of a support for said jaws, mechanism for intermittently rotating said support, means for successively operating said connections to close said jaws, a movable transfer for delivering bunches to said jaws during a dwell in the rotation of the support, locators, means moving said locators into engagement with the ends of a bunch in said transfer to locate the same prior to shaping operation of the jaws thereon, and means for rotating said locators while in engagement with said bunch ends.

14. The combination with a plurality of bunch shaping devices each having shaping jaws and actuating connections for opening and closing said jaws, of a support for said jaws, mechanism for intermittently rotating said support, means for successively operating said connections to close said jaws, a movable transfer for delivering bunches into the range of action of said jaws during dwells in the rotation of said support, locators, and means moving said locators into engagement with the ends of a bunch in said transfer while in the range of action of said jaws to locate the same prior to the shaping operation of the jaws thereon.

15. The combination with a plurality of bunch shaping devices, of actuating members therefor, a support for said devices and members, mechanism for intermittently rotating said support, transfer means including grippers engaging said bunches to deliver the bunches within the range of action of said shaping devices, said shaping devices each having shaping jaws, of connections between said actuating members and said jaws for operating the jaws, means cooperating with said actuating members for successively operating the jaws to close on the bunch while held in said grippers, said cooperating means including a movable element external to the support arranged to engage the actuating member of each shaping device.

SIGURD CLAUSEN.